Sept. 24, 1963

J. E. BRODERICK ETAL 3,104,694

TOOL FOR CONTOURING HONEYCOMB CORE

Filed Dec. 8, 1959

INVENTORS.
JOHN E. BRODERICK
OTTO M. BEHR
BY
ATTORNEY

Sept. 24, 1963       J. E. BRODERICK ETAL       3,104,694
TOOL FOR CONTOURING HONEYCOMB CORE
Filed Dec. 8, 1959                 2 Sheets-Sheet 2
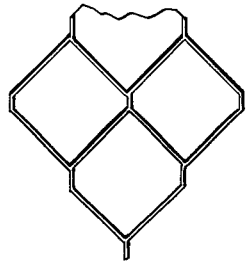
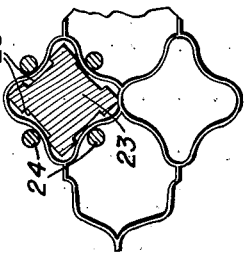
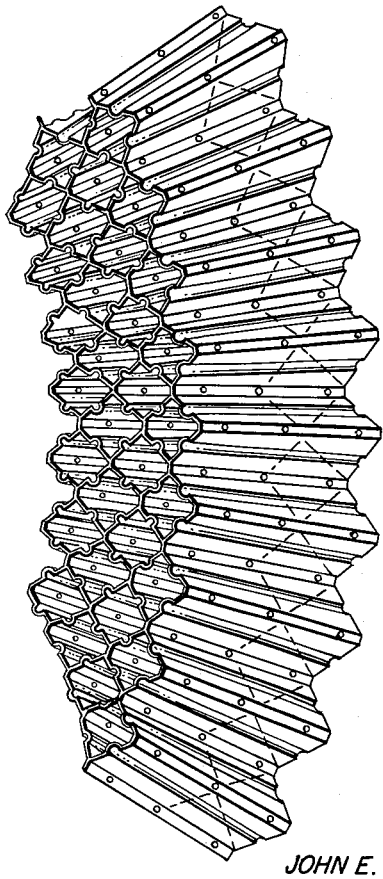
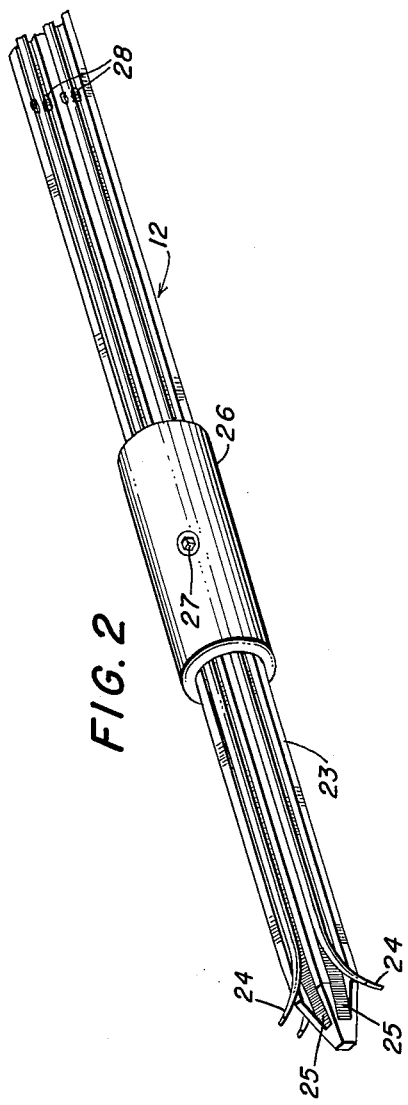
INVENTORS
JOHN E. BRODERICK
OTTO M. BEHR
BY
ATTORNEY United States Patent Office 3,104,694
Patented Sept. 24, 1963

3,104,694
TOOL FOR CONTOURING HONEYCOMB CORE
John E. Broderick, Anne Arundel County, and Otto M. Behr, Baltimore County, Md., assignors to Martin-Marietta Corporation, a corporation of Maryland
Filed Dec. 3, 1959, Ser. No. 858,259
4 Claims. (Cl. 153—70)

This invention relates to the contouring of honeycomb core material into desired curvature, and more particularly to a method for selectively diminishing the areas of the cells on one side of a billet of honeycomb core to bring about the desired contouring of the core, and to the tool for carrying out such methods.

Honeycomb core has been widely used in industry because of its comparatively high strength to weight ratio and its economy, and because of such advantages associated with its use, it has been extensively used in the manufacture of wings, tail surfaces, and flooring of aircraft, as well as many non-aircraft uses in which highly dependable, light-weight structural material can be employed to advantage. Honeycomb core may be made according to several procedures, such as by using pre-corrugated core sections whose crests are secured together to create rows of regular cells, or by the expanded core method. Latter method involves securing a number of flat sheets of foil together at spaced intervals, with alternate sheets secured in staggered relation, so that when the sheets are pulled apart, a plurality of honeycomb cells of hexagonal or modified hexagonal configuration are created. These types of core are cited merely by way of background, for the particular method by which a billet of honeycomb core is formed is not important to the practice of this invention.

After a billet of core has been manufactured, it is then often desirable to modify the shape of the billet so that it could, for example, be used in an instance in which a curved or a compound contour is called for. In the Pajak Patent No. 2,609,068, assigned to the assignee of the present invention, it is described how a billet of honeycomb core can be contoured by selective crushing of portions of the billet. Other procedures involve heating a billet of core while subjecting it to pressures of a large hydraulic press equipped with a die of appropriate configuration to cause the billet to take a definite set. However, none of these procedures for causing honeycomb core to assume a desired curved configuration has been entirely sufficient for all purposes.

According to the present invention, a billet of honeycomb core may be contoured without the use of heat or expensive dies, with the resulting core material being configured to a precisely accurate contour, and possessing high strength. This is advantageously accomplished by utilizing a tool for modifying individual cells of a billet of cellular honeycomb according to a well-defined and simple procedure, so as to create a billet having a desired contour. The tool, which may be used singly or in conjunction with a number of other tools, comprises an elongated central spindle member having at one end thereof a tip adapted to enter individual cells of the billet of honeycomb core material to be contoured.

A plurality of resilient tines are arranged in spaced relation about the spindle for controllably deforming the walls of cells adjacent to the cell being entered by the spindle, with each of these tines being disposed in substantially parallel relation with the spindle and being of substantial length. Each tine has a tip portion simplifying entry into a cell adjacent a cell being entered by the spindle as it is caused to enter the billet, with the spindle being equipped with longitudinal recesses in which the tines are disposed. These recesses accommodate the side wall of each cell entered by a respective tine, and securing means are located a spaced distance on the spindle away from the tip thereof for securing the tines in positions lying closely along the spindle in the longitudinal recesses, whereby as the spindle is caused to move from a distance into a cell of a billet of honeycomb core, the tines cause the side walls of the adjacent cells to be brought into these recesses to create a cell having diminished cross-section on one side of the billet.

The method of contouring honeycomb core according to this invention involves the use of such a tool, and comprises the steps of inserting the tool into each cell of a row of cells until the tines of the tool have modified to a desired degree the adjacent cells, and continuing to modify other rows of cells of the core in a pre-established procedure by inserting said tool into such cells so as to foreshorten one side of the billet of core with respect to the other, whereby to conform the core to a desired curved contour.

These and other objects, features and advantages of this invention will be apparent from an inspection of the drawings in which:

FIGURE 2 is a perspective view of a typical tool according to this invention, this figure illustrating the tension adjustment collar that may be adjusted to control the deflection of the tines of the tool;

FIGURE 3 is a perspective view of a typical section of honeycomb core that has been contoured according to this invention by diminishing the cell ends on one side of the billet;

FIGURE 4 is an enlarged view illustrating the configuration of a few cells prior to the contouring operation according to this invention; and FIGURE 5 is a view similar to FIGURE 4 taken after two of the cells of the group have been modified by the use of the tool.

Figure 1:
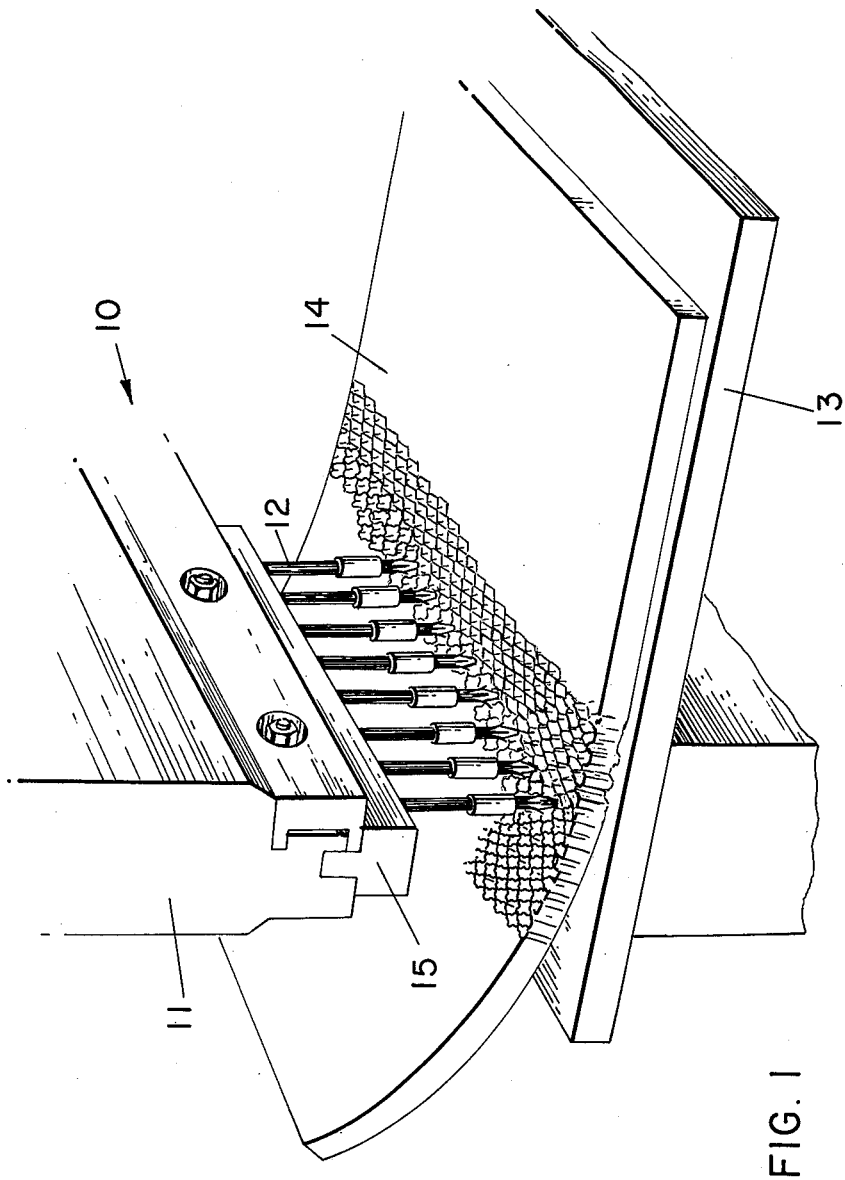
FIGURE 1 is a view of a typical machine for operating upon the cells of a billet of honeycomb core by the use of a number of tools operated substantially simultaneously.

Referring to FIGURE 1, a honeycomb contouring machine 10 is there shown, comprising a movable head 11 on which a number of contouring tools 12 are mounted in spaced relation, a table 13 adapted to support a billet of honeycomb core during a contouring operation, and a billet of core 14 that is being acted upon by tools 12 to convert the billet from a flat configuration into a curved configuration. The machine 10 may be a press brake, of which head 11 would be the ram, or the machine may be a punch press.

The plurality of tools 12 are arranged to be reciprocated vertically with respect to a billet of core 14, as the head 11 of device 10 is moved. Tools 12 are for example mounted in a support block 15 secured to the bottom of movable head 11 of the machine, and the spacing of these tools is preferably of such distance that said tools simultaneously enter alternate cells of an aligned group or row of cells. That is to say, the spacing of toools 12 preferably does not involve tools secured together as close as spacing of the cells of the billet, but rather of a spacing agreeing with the distance between every other cell so that at least two applications of the group of tools to each row of cells of the billet is in order. This arrangement makes unnecessary the crowding of the series of tools 12 in the head 11 of the machine.

The billet 14 is being indexed rearwardly, or to the left as seen in FIGURE 1, each time a row of cells is completed, thereby explaining the curvature of billet 14 on the left of tools 12, whereas the remaining portion is flat, with the cells regular.

Turning now to FIGURE 2, a typical tool is there shown, comprising elongated central spindle member 23, and a plurality of forming prongs or tines 24 secured thereabout in spaced relation. These tines are substantially parallel to the spindle, may be of approximately the same length thereof, and are each equipped with a tip arranged to enter the cells adjacent each cell entered by the spindle. Spindle 23 preferably is equipped with a plurality of spaced longitudinal recesses 25 thereabout, with a tine adapted to be accommodated in each recess. The tines are secured such as by spotwelds 28 to the spindle at a location remote from the tip of the spindle so that as the spindle is caused to move for a distance into a cell of the billet of honeycomb core, the comparatively stiff tines extending into the cells adjacent the "center" cell penetrated by the spindle will cause the side walls common to the center cell and each adjacent cell to be brought inwardly into said recesses 25 and thereby caused to undertake a fixed set. In this manner, the cross section of each cell entered by the spindle is to be diminished. This detail is best seen in FIGURE 5, with this figure also revealing that the cells intermediate the diminished cells become somewhat larger than usual. Tension adjustment collar 26 can be moved along tool 12 to control the amount of deflection of tines 24 that is permitted. By moving the collar toward the tip the tines are caused to have shorter effective length, and hence are stiffer, thus causing a pronounced deformation of cell walls, whereas by adjusting the collar at a location of the tool remote to the tip, the tines become comparatively flexible, and cause less deformation of cell walls when inserted into a cell. Locking screw 27 is provided to assure the collar will not slip from the desired location.

Referring to FIGURE 3 it will be observed that approximately half of the cells have diminished crosssection, which is of course brought about by moving a tool 12 according to this invention into each cell of alternate rows of the core. These alternate rows of modified cells extend both the length and the width of the billet, with the lengthwise rows preferbaly being essentially perpendicular to the rows running the width of the billet. By this procedure the cells of a billet of core are modified in a highly regular pattern, with the decrease in cell area brought about by one-half of the cells being modified being sufficient to contour the billet.

The configuration of the billet and the degree of curvature thereof is brought about by carefully controlling the degree to which certain cells are diminished, for as should be obvious, the more the diminished cells of a billet such as shown in FIGURE 3 are deformed, the more curvature of the billet is brought about. Therefore, the operator may find it necessary to adjust tension adjustment collar 26 several times during operation upon a given billet so as to bring about different cell areas in particular locations.

By the practice of our invention, we have successfully contoured billets of core 1 inch thick to a spherical radius of 12 inches, or to a single bend radius of 4 inches. Core contoured into a single bend radius is without anti-clastic characteristics i.e., does not tend to "saddleback." Although 1 inch thickness was mentioned, this invention in its illustrated form is adapted for use with core up to approximately 2 inches thick.

We have found that the thicker the core, the shallower the curvature. The average wall thickness of such core ranges from .0015" to .005", but of course this invention is not to be limited to such sizes and thicknesses, for by some redesign within the spirit of our invention, we can use our technique in widely varying applications, some of which may exceed the dimensions or thicknesses of material regarded as being honeycomb core. This invention is not to be limited except by the scope of the appended claims.

We claim:

1. A tool for modifying the shape of individual cells of a billet of cellular honeycomb core to bring about a controlled curvature of the billet, said tool comprising an elongated central spindle member having at one end thereof a tip adapted to enter individual cells of the billet of honeycomb core material, a plurality of tines arranged in spaced relation about said spindle, each of said tines being disposed in substantially parallel relation with said spindle, and each having a tip portion simplifying entry into a cell adjacent a cell being entered by said spindle as it is caused to enter said billet, said spindle having longitudinal recesses to accommodate said tines, and securing means located a spaced distance on said spindle away from the tip thereof for securing said tines in positions lying closely along said spindle in said longitudinal recesses.

2. A tool for modifying the shape of individual cells of a billet of cellular honeycomb core to bring about a controlled curvature of the billet, said tool comprising an elongated central spindle member having at one end thereof a tip adapted to enter individual cells of the billet of honeycomb core material, a plurality of resilient tines arranged in spaced relation about said spindle, each of said tines being disposed in substantially parallel relation with said spindle, and each having a tip portion simplifying entry into a cell adjacent a cell being entered by said spindle as it is caused to enter said billet, said spindle having longitudinal recesses to accommodate said tines, and securing means located a spaced distance on said spindle away from the tip thereof for securing said tines in positions lying closely along said spindle in said longitudinal recesses, whereby as said spindle is caused to move for a distance into a cell of a billet of honeycomb core, said tines cause the side walls of adjacent cells to be brought into said recesses to create a cell having diminished cross section on one side of said billet.

3. A tool for modifying the shape of individual cells of a billet of cellular honeycomb core to bring about a controlled curvature of the billet, said tool comprising an elongated central spindle member having at one end thereof a tip adapted to enter individual cells of the billet of honeycomb core material, and a plurality of resilient tines secured in spaced relation about said spindle for controllably deforming the walls of cells adjacent the cell being entered by said spindle, each of said tines being disposed in substantially parallel relation with said spindle, and each having a tip portion simplifying entry into said adjacent cells to deform the walls of said adjacent cells toward said spindle as it is traversing a cell centrally disposed with respect to said adjacent cells, said spindle having longitudinal recesses in which said tines are disposed, each recess accommodating the side wall of a cell entered by a respective tine, and tension adjustment means on said spindle for controlling the degree of deflection of said tines as they enter said adjacent cells, whereby as said spindle is caused to move successively into a plurality of cells of a billet of honeycomb core, said tines cause the side walls of cells adjacent the entered cells to be brought into said recesses, thereby eventually diminishing the cross sectional area of one side of said billet.

4. A machine tool for modifying the shape of individual cells of a billet of cellular honeycomb core to bring about a controlled curvature of the billet, said machine tool comprising a plurality of individual tools, each comprising an elongated central spindle member having at one end thereof a tip adapted to enter individual cells of the billet of honeycomb core material, and plurality of resilient tines arranged in spaced relation about said spindle for controllably deforming the walls of cells adjacent the cell being entered by said spindle, each of said tines being disposed in substantially parallel relation with said spindle, and each having a tip portion simplifying entery into said adjacent cells to deform the walls of said adjacent cells toward said spindle as it is traversing a cell centrally disposed with respect to said adjacent cells, said spindles having longitudinal recesses in which said tines are disposed, and tension adjustment means on each spindle for controlling the degree of deflection of said tines as they enter said adjacent cells, whereby as said spindles are caused to move successively into a plurality of cells of a billet of honeycomb core, said tines cause the side walls of cells adjacent the entered cells to be brought into said recesses, thereby eventually diminishing the cross sectional area of one side of said billet.

References Cited in the file of this patent

UNITED STATES PATENTS

| | | |
|---|---|---|
| 494,626 | Collins | Apr. 4, 1893 |
| 569,431 | Sergeant | Oct. 13, 1896 |
| 1,420,608 | Andrew | June 20, 1922 |
| 1,777,728 | Kumpf | Oct. 7, 1930 |
| 2,087,302 | Rodman | July 20, 1937 |
| 2,483,001 | Carswell et al. | Sept. 27, 1949 |
| 2,531,489 | Wood | Nov. 28, 1950 |
| 2,735,474 | Sherwood | Feb. 21, 1956 |
| 2,851,133 | Steele | Sept. 9, 1958 |
| 2,910,153 | Campbell | Oct. 27, 1959 |